US 6,561,489 B1

(12) United States Patent
Wakefield

(10) Patent No.: US 6,561,489 B1
(45) Date of Patent: May 13, 2003

(54) AUTOMATIC WINCH DRIVE SYSTEM

(75) Inventor: James T. Wakefield, Palmdale, CA (US)

(73) Assignee: DEFS INC, Las Vegas, NV (US)

(*) Notice: Subject to any disclaimer, the term of this patent is extended or adjusted under 35 U.S.C. 154(b) by 0 days.

(21) Appl. No.: 09/520,181

(22) Filed: Mar. 7, 2000

(51) Int. Cl.$^7$ ................................................. B66D 1/00
(52) U.S. Cl. ..................... 254/323; 414/463; 224/42.23
(58) Field of Search ................................ 254/323, 362; 414/463–466; 224/42.12, 42.23

(56) References Cited

U.S. PATENT DOCUMENTS

| | | | | |
|---|---|---|---|---|
| 3,856,167 A | * | 12/1974 | Yasue et al. | 224/42.23 |
| 4,127,295 A | * | 11/1978 | Robinson | 254/362 |
| 4,331,323 A | * | 5/1982 | Sekimori et al. | 254/362 |
| 4,548,540 A | * | 10/1985 | Renfro | 414/463 |
| 4,613,273 A | * | 9/1986 | Wagner | 414/463 |
| 5,098,068 A | * | 3/1992 | Jussila | 254/362 |
| 5,398,911 A | * | 3/1995 | Holster | 254/362 |
| 5,791,859 A | * | 8/1998 | Simnacher | 414/463 |
| 6,105,938 A | * | 8/2000 | Koida | 254/362 |

FOREIGN PATENT DOCUMENTS

| | | | | |
|---|---|---|---|---|
| DE | 190246 | * | 9/1957 | 254/362 |

* cited by examiner

Primary Examiner—Emmanuel Marcelo

(57) ABSTRACT

An automatic winch drive system (AWDS) adapted to mount a motorized conveyance and designed specifically to raise and lower a spare tire and wheel. The AWDS is adapted to mount a motorized conveyance at the rear portion of same during factory installation or as an after-purchase accessory/enhancement. The principal object includes the following: a power cell, a reversing control switch, an electric gear motor, an adapter, a drive, a gib, threaded fasteners, a limit switch, an alert and a manual redundancy. The redundancy activates the gear motor's rotor, gearbox and drive; it is built into the system to override the automatic setting in the event of an electrical malfunction or power failure. The principal object has a warning mechanism that broadcasts an alert when the winch cable has been deployed; it remains in effect until the spare tire and wheel are returned to their appropriate storage configuration. The pilot alert is broadcast whenever contact with the spare tire and the limiting switch has been breached. A power cell within the conveyance actuates the electric gear motor and drive to automatically raise and lower the winch cable, spare tire, and wheel. Operating a manual hand-crank winch to access a spare tire, which is stored at the undercarriage of a van or sports utility vehicle (SUV), or under the bed portion of a truck, requires the application of sheer physical force. The principal object precludes the need for such exertion on the part of the user/operator.

7 Claims, 3 Drawing Sheets

AUTOMATIC WINCH DRIVE SYSTEM

BACKGROUND OF INVENTION

1. Field of Invention

This invention relates to winch systems and electrically powered gear motors, but in particular, it relates to an apparatus that is specifically designed for use on a motorized conveyance that is equipped with a factory installed spare tire winch mechanism. The principal object is one that is designed to be adapted to trucks, vans and sports utility vehicles (suv's); it can be mounted to the vehicle's frame, bed, or under carriage, beneath, the conveyance, proximate to the rear bumper. The principal object is adapted to mount the underside of a vehicle, at the rear portion of same; it is positioned under the vehicle and generally is not visible to the naked eye.

2. Description of the Prior Art

Historically, motor vehicle winch systems have been installed on the exterior of conveyances at either the forward or rear section. The winches are generally affixed to mount a designated point on the front or rear bumper. Another less obvious, yet equally appropriate use for a winch apparatus on a motor vehicle is its use part of a control and storage system for a vehicle's spare tire and wheel. This type of storage system can be found on a significant number of trucks, vans and suv's; it is installed so as to mount the frame or body of the vehicle. Currently, no standardized or systematic factory installed, or aftermarket automatic winch drive system (AWDS) similar to the principal object, disclosed herein, has been commercially developed or adapted for use at large, on trucks, vans and sports utility vehicles.

Consumer demand for sophisticated automatic and power items, such as power steering, power seats, power brakes, fully electric windows, electric antennas and the like is constant. Consumer sophistication has heightened and automobile manufacture have responded by providing the customer with new, improved and innovative systems that are luxurious as well as user friendly. Trucks, vans and suv's are no exception when it comes to full-power or fully automatic systems, which are adapted to them.

Although tire manufactures have improved the quality and roadworthiness of their products, a spare tire still remains an important part of the safe operation of motorized conveyance. An argument that is often times advanced, by automotive mechanics and suppliers of parts and service, is that a spare tire is, in point in fact, the most important tire of all. Unencumbered access to spare tire and wheel, during a roadside emergency can expedite a safe return to the highway. Any unnecessary delay, which causes the operator of a vehicle to remain on a busy highway or roadway, exposed to traffic, and the elements, presents a substantial risk to the personal safety of the motorist and/or passengers. As exposure to the elements and passing motor vehicles increases, so does the likelihood of a roadside mishap or traffic collision. The principal object of this disclosure expedites accessibility of a spare tire and wheel. The AWDS allows the user/operator "fingertip" access to a spare tire and wheel in a fully automatic setting.

Heretofore, manually operated, spare tire which systems have required the user/operator, to perform a series of steps, in a lengthy process, in order to retrieve and to make use of a motorized conveyance's spare tire and wheel. The user/operator must first locate and then access a long metal hand-crank. Said crank is generally stored in the engine compartment of a truck, van or suv. After manually opening the hood compartment, the user/operator must physically remove the hand-crank tool from its storage position. Once the hand-crank has been retrieved from its resting-place, the user/operator must then carry the hand-crank back to the rear portion of a vehicle. At the rear of the vehicle, the user/operator must insert the hand-crank into a receiver opening. The opening to the winch is generally located on or in close proximity to the rear bumper portion of the motorized conveyance. The hand-crank is inserted into the opening that is provided for same and is then turned manually in either a clockwise or counter clockwise fashion. The user/operator can then activate the winch mechanism and subsequently deliver the spare tire for use. The user/operator must personally provide power to the crank handle. The turning of the crank causes the winch mechanism to either raise or lower the tire, wheel, cable and fastener. After a series of rotations of the crank handle, the winch cable and fastener are either reeled in or reeled out. A spare tire and wheel can be lowered to the ground or returned to its storage position. The repetitive turns of the hand-crank activate the delivery, and/or return of the winch mechanism's cable. The rotation of the hand-crank causes the spare tire and wheel, which is affixed to a metal cable or chain by means of a fastening member, to be lowered and/or raised. Whenever the hand-crank is manually operated, the drive shaft turns in one or two directions. The spare tire and wheel are normally stored and mounted in physical contact with the undercarriage of a conveyance. Once the winch cable has been fully unreeled, the wheel may then be removed from the winch's fastening means. At that point, the tire and wheel are lowered and the winch cable fastener may be removed from the wheel so that the spare tire may be used as is required.

The previously described process involves several steps; it requires that the user walk about the vehicle several times and personally exert a significant amount of physical force to either lower or raise a winch cable, tire and wheel. The user/operator must personally lift, carry, insert, and then turn the hand-crank in order to activate the factory installed winch mechanism. Extreme weather and temperature conditions can affect the manual process. Specifically, the user/operator must grip, remove and carry either a hot or cold metal handle crank. Further, in situations where weather is a factor, the user/operator may be exposed to the elements for a protected time period while he or she manually operates the hand-crank and winch apparatus.

The current state of the art for storing a hand-crank is for it to be placed in an engine compartment. Such a placement exposes the hand-crank to sever temperature extremes created either by the vehicle's internal combustion engine, or the outside elements. Currently, a user/operator is limited to a "manual only" option when using a spare tire and wheel winch system. The manual option requires that the user/operator obtain a hand-crank and drive, and then complete the processes of lowering and/or subsequently raising the winch's cable, fastener, and spare tire personally. Manual automotive spare the storage winches require that a user/operator provide the power to delivered and subsequently return a spare tire and wheel. The principal object, an AWDS, changes and improves that condition, now a user/operator has the ability to deliver and return a spare tire in a fully automatic fashion.

Further, whenever the wheel portion of a spare tire, of a truck, van or suv is inverted, the hub portion may be used for storage purposes. The IN THE TIRE TOOLBOX® was developed specifically for use, storage and placement in the hub of a spare; it is an example of an object, which can receive tools and then be stored within the tire. The inverted spare tire, the AWDS and the IN TIRE TOOLBOX® provide a way to maximize efficiency and storage space. Now and in the future, a portion of vehicle, which was previously deemed useless, and of no real consequences takes on a new utility. For example, the IN TIRE TOOLBOX® can be placed in a wheel's hub, in a manner previously not designed for storage purposes. The IN TIRE TOOLBOX® can hold tools and other types of equipment, all of which are suitable for use during a roadside emergency, mishap or any general purpose. The principal object makes a spare tire available for immediate access and use by means of a fully automatic winch drive system (AWDS).

BRIEF SUMMARY OF THE INVENTION

The invention, an automatic winch drive system (AWDS), is a combination power cell, gear motor, actuation device, drive, coupling adapter, mounting bracket, alert, and redundancy, which is electrically wired, connected, and mounted to a conveyance to create an entire system. The principal object adapts and works with equipment that has already been installed on a vehicle at time of manufacture. The AWDS is suited to be permanently affixed to a truck, van or suv creating a fully automatic delivery and return system for a spare tire and wheel. The AWDS provides an improved method of equipment access, delivery, retrieval and return. Most domestic and foreign trucks, vans and suv's come equipped with a full sized spare tire. A significant number of these conveyances come with the spare tire and wheel that is adapted to mount the undercarriage of a vehicle, affixed by way of a factory installed winch apparatus. The wheel and tire are attached to the winch, by means of a cable and/or chain and a fastener. For the purposes of this Patent the terms "winch cable" and "winch chain" shall be interchangeable and all-inclusive. Conveyances with a factory installed winch feature may have the principal object mounted to them either at time of manufacture, or have an AWDS retrofitted in an after market fashion. The principal object is appropriate for both new and old motorized conveyances. Currently, only factory installed manually operated, winch systems are found in foreign and domestic trucks, vans and suv's. The manual system can be improved, so that the winch system is converted to a fully automatic mode. Furthermore, a fully automatic system with a manual back-up feature is an improvement that incorporates the reliability of the current manual method and the added convenience of the principal object's system. In those conveyances where the "spare time" is adapted to be stored and mounted to a segment of the vehicles under carriage, back bed, or frame, the principal object automates the delivery and return. The principal object provides a user/operator a power option to access and subsequently control a "spare tire." The AWDS provides the user/operator a more efficient, and significantly less, physically, demanding method of delivering a spare tire. With the installation of the AWDS, the hub of a spare tire's wheel takes on a new characteristic; it now becomes an open storage container or a receptacle for equipment such as traction cables, roadside emergency equipment, tools, and a toolbox.

DETAILED DESCRIPTION OF THE INVENTION

Figure 1:
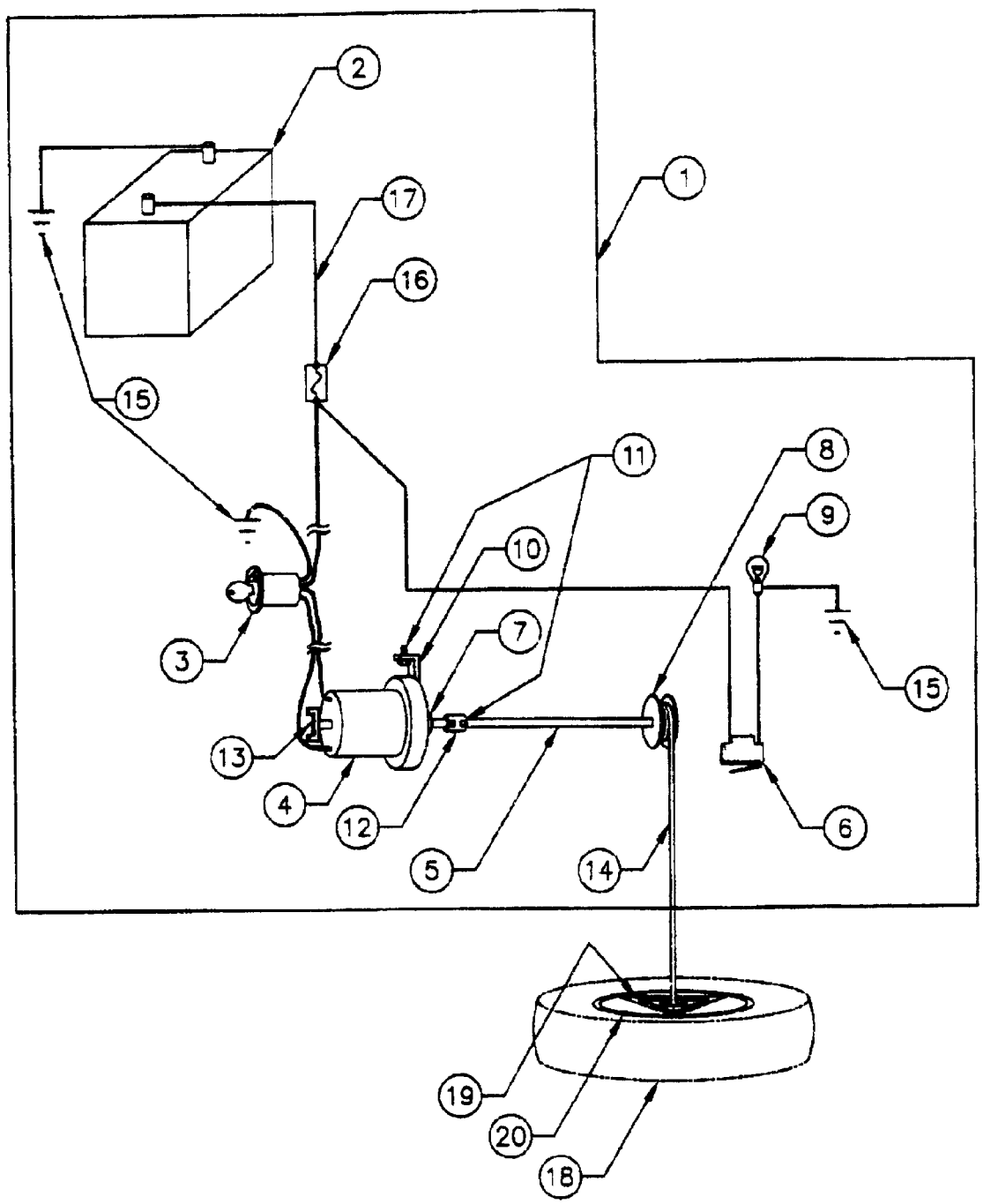
FIG. 1 is an arrangement of the automatic winch drive system.
Figure 2:
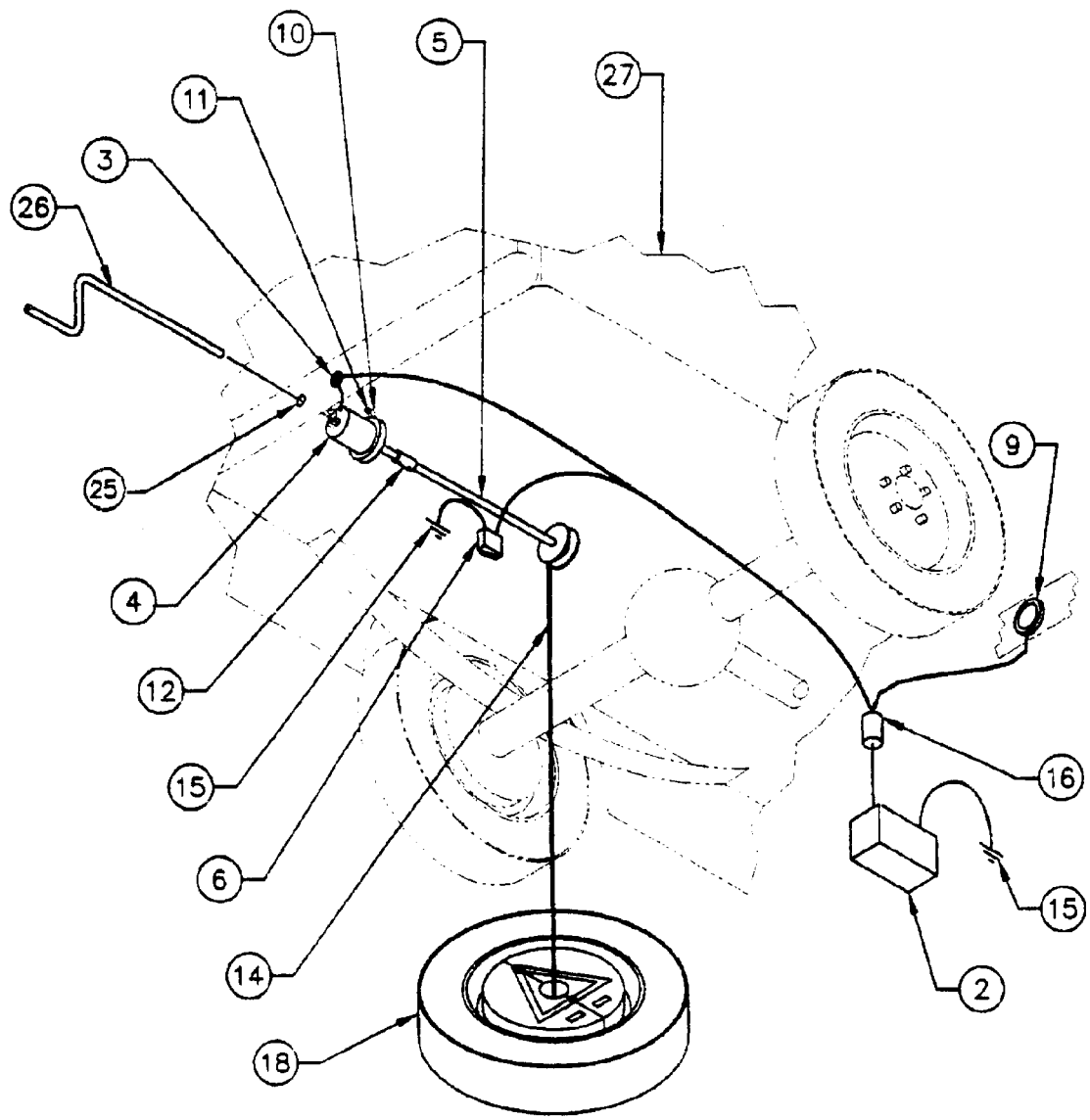
FIG. 2 is a perspective view of the principal object, which illustrates its embodiment when adapted to mount a pick-up truck.
Figure 3:
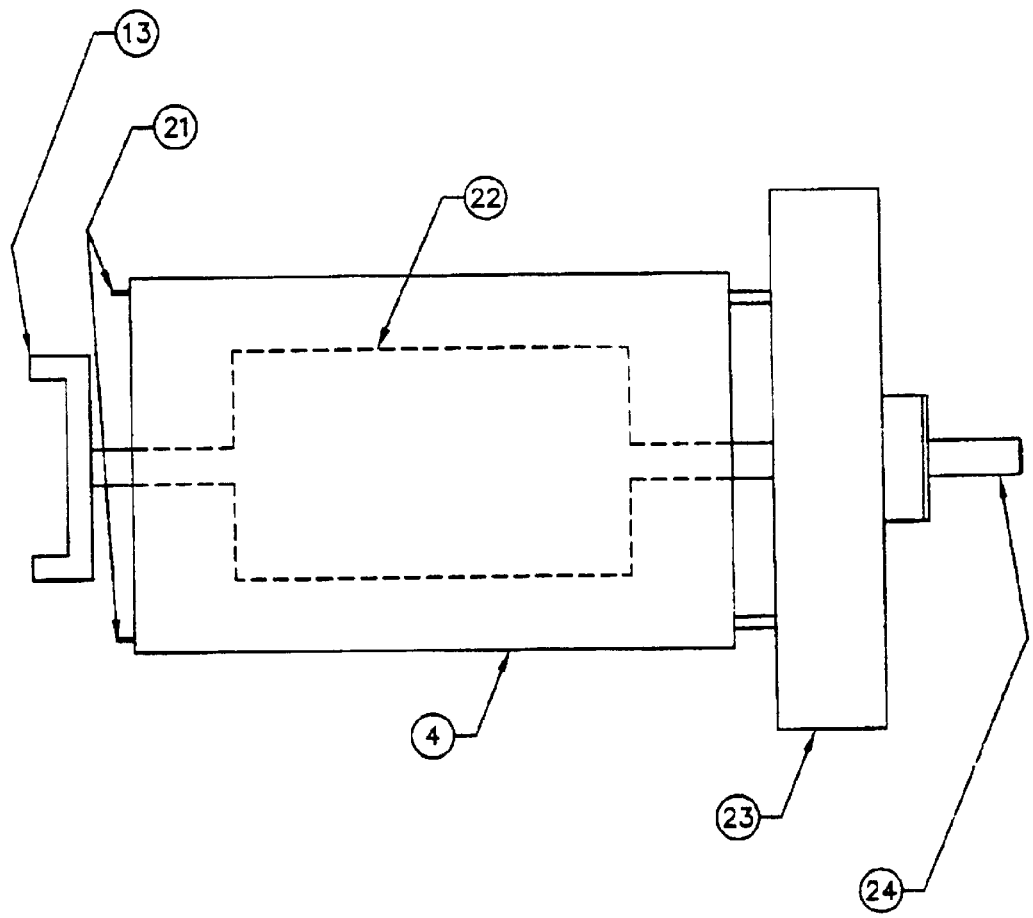
FIG. 3 is a side view of the electric motor depicting the extended rotor and dual crank-arms.

The accompanying drawings and FIG. 1, in particular, reveal the preferred embodiment of the principal object. In the drawings the principal object 1 power cell 2 keyed control reversing switch 3 electric DC gear motor 4 drive shaft 5 limit switch 6 primary crank-arm 7 winch apparatus 8 pilot/ warning light 9 bracket 10 threaded fasteners 11 a coupling adapter 12 subordinate crank-arm 13 winch cable 14 negative ground 15 fuse 16 electric wire 17 spare tire 18 wheel 19 In Tire Toolbox® 20 gear motor electric contacts 21 rotor 22 gear box 23 out put shaft 24 winch access port 25 hand crank 26 motorized conveyance 27 are depicted.

The materials that the principal object may be made from include, but are not limited to, the following: aluminum, copper, metal, steel, thermoplastic, rubber, glass, paper, fiberglass, composite materials or any combination thereof. The keyed control reversing switch 3 is connected to the electrical circuitry means of the conveyance 27. The reversing switch 3 functions to prevent electric motor burn out. The invention can be activated and is fully operable whether or not a vehicle's engine is running. The AWDS receives current from actuation of the reversing switch 3 from the power cell 2. The reversing switch 3 activates the automatic winch drive system and controls direction of travel of the drive shaft 5. Electric current travels via wire 17 to activate the DC electric gear motor 4. Power to the gear motor causes the drive shaft 5 to rotate in either clockwise or counter clockwise direction. When actuated, the principal object can raise or lower a spare tire 18 and wheel 19, which are adapted to be mounted on a winch cable 14. Immediately, upon release of the reversing switch 3 the AWDS ceases movement. The drive shaft 5 is connected to the coupling adapter 12. The adapter 12 is also affixed to the motors output shaft 24. The drive shaft 5 extends to and is received into the winch apparatus 8. Activation of the principal object 1 causes the winch cable portion and/or chain to either descend or to ascend, thereby lowering or raising the attached spare tire. The drive shaft 5 remains attached to coupling adapter 12 by a pair of threaded fasteners 11. The electric motor is adapted to mount a conveyance by means of a gib or bracket 10. A second pair of threaded fasteners 11 are used to secure the electric DC gear motor 4 and the bracket 10 to the frame or undercarriage of the motorized conveyance 27. The overall length of the practical object's drive shaft 5 is sufficient to span the disease between the coupling adapter 12 which is affixed to the gear motor 4 and the winch apparatus 8. The terminal portion of the drive fits snugly into the receiver portion of the factory installed winch apparatus 8. The electric gear motor 4 drive shaft 5 and winch apparatus 8 automatically operate when they are energized. The drive 5 causes the winch cable 14 to either reel in or reel out.

A keyed reversing switch 3 is presented in this disclosure; it is designed for usage on a pick-up truck and to prevent unintentional and unauthorized access to and activation of the device. Because the control switch portion of principal object is located at a portion of the conveyance that is not within the passenger compartment, and that is capable of being assessed and activated by unauthorized persons, a key control is described in conjunction with the reversing switch. As such, this disclosure utilizes a keyed control integrated with a reversing switch. When the principal object is adapted to mount a van or a sports utility vehicle, the lockable rear door and/or doors of either a van or suv provide the necessary means to prevent unintentional and unauthorized activation of the AWDS. Use of a combined keyed-control reversing switch for the purpose of this disclosures relates solely to the differences in design features between a pick-up truck, and a van or suv. A significant portion of the principal object's utility, as disclosed, is the ability to provide the user/operator an environment wherein a control protects the spare.

I claim:

1. An automatic winch drive system adapted to mount a motorized conveyance and designed specifically to raise and lower a spare tire and wheel comprising:

(a) a power cell, (b) an electric gear motor, (c) a self closing reversing switch, (d) a limit switch, (e) an alert, (f) a driveshaft, (g) a spare tire and wheel winch assembly and (h) a fuse.

2. An automatic winch drive system as described in claim 1, wherein the gear motor is activated by the power cell, causing a crank-arm on the electric motor to rotate, the rotation powers the drive shaft, which, as adapted to the winch, activates the pulley action, reeling in and reeling out a cable or chain fitted to the winch.

3. An automatic winch drive system as described in claim 1, wherein the gear motor is adapted to mount a motorized conveyance in either a factory direct or after market fashion by a connecting gib that is fitted with removable threaded fasteners, the coupled grip and gear motor are adapted to mount an undercarriage of a conveyance proximate to the winch drive system.

4. An automatic winch drive system as described in claim 1, wherein the self-closing reverse switch is engaged to activate operational voltage from the power cell to actuate the winch drive system, engaging the switch causes rotation of the system's drive shaft in either a clockwise or counterclockwise fashion.

5. An automatic winch drive system as described in claim 1, wherein the electric gear motor has an operational redundancy allowing for two power settings: manual and automatic, the manual drive mode may be achieved by affixing a hand-operated crank onto a subordinate crank-arm located on the gear motor allowing the system to become fully operational in the event of a failure of the automatic mode.

6. An automatic winch drive system as described in claim 1, wherein the alert, comprising a pilot light broadcasting warning, is adapted to mount a control console of the motorized conveyance, the light is interconnected to and between a negative ground and the limit switch and indicates whether contact between the limit switch and the spare tire assembly has taken place and whether the tire assembly is properly secured to an undercarriage of a motorized conveyance.

7. An automatic winch drive system, as described in claim 1, wherein the electric circuitry of the motor, comprising a path of electric current, is weather, dust and water resistant, so that use of the system after contact with standing water, severe temperature or weather extremes, will resist failure brought on by an electrical short or similar malfunction.

* * * * *